(12) United States Patent
Borgerson

(10) Patent No.: US 7,857,726 B2
(45) Date of Patent: Dec. 28, 2010

(54) EIGHT SPEED TRANSMISSION WITH PLANETARY AND LAYSHAFT GEARING

(75) Inventor: James B. Borgerson, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 342 days.

(21) Appl. No.: 11/970,050

(22) Filed: Jan. 7, 2008

(65) Prior Publication Data

US 2009/0005208 A1 Jan. 1, 2009

Related U.S. Application Data

(60) Provisional application No. 60/947,150, filed on Jun. 29, 2007.

(51) Int. Cl.
*F16H 3/44* (2006.01)
(52) U.S. Cl. ........................ 475/311; 475/330; 475/302
(58) Field of Classification Search .................. 475/271, 475/275–291, 302, 311, 330
See application file for complete search history.

(56) References Cited

U.S. PATENT DOCUMENTS

| | | | | |
|---|---|---|---|---|
| 7,695,391 B2 * | 4/2010 | Phillips et al. | .............. | 475/275 |
| 2009/0054197 A1 * | 2/2009 | Wittkopp et al. | ............ | 475/276 |
| 2009/0082160 A1 * | 3/2009 | Phillips et al. | .............. | 475/218 |
| 2009/0082164 A1 * | 3/2009 | Wittkopp et al. | ............ | 475/276 |
| 2009/0082165 A1 * | 3/2009 | Phillips et al. | .............. | 475/276 |
| 2009/0082166 A1 * | 3/2009 | Wittkopp et al. | ............ | 475/311 |
| 2009/0082167 A1 * | 3/2009 | Wittkopp et al. | ............ | 475/311 |

OTHER PUBLICATIONS

Prof. Dr.-Ing. Peter Tenberge, Multi-Line Automat paper, presented at CTi Symposium Automotive Transmissions, Southfield, Michigan, Jun. 2007.
Prof. Dr.-Ing Peter Tenberge, Multi-Line Automat slide presentation, presented at CTi Symposium Automotive Transmissions, Southfield, Michigan Jun. 2007.

* cited by examiner

*Primary Examiner*—David D Le
*Assistant Examiner*—Derek D Knight
(74) *Attorney, Agent, or Firm*—Quinn Law Group, PLLC

(57) ABSTRACT

A transmission is provided that utilizes three planetary gear sets and three layshaft gear sets, as well as four rotating-type clutches and one brake that are engagable in different combinations to provide eight forward speed ratios between an input member and an output member of the transmission. By combining features of a layshaft transmission with those of a planetary transmission, the low spin losses and packaging convenience typical of a layshaft transmission are available while still achieving the high torque capacity typical of a planetary transmission.

6 Claims, 4 Drawing Sheets

|     | 90<br>90A<br>190 | 98<br>98A<br>198 | 94<br>94A<br>194 | 92<br>92A<br>192 | 96<br>96A<br>196 |
|-----|------------------|------------------|------------------|------------------|------------------|
| REV | x                | x                |                  |                  | x                |
| N   |                  |                  |                  |                  |                  |
| 1st | x                | x                | x                |                  |                  |
| 2nd | x                | x                |                  | x                |                  |
| 3rd |                  | x                | x                | x                |                  |
| 4th |                  | x                |                  | x                | x                |
| 5th |                  | x                | x                |                  | x                |
| 6th |                  |                  | x                | x                | x                |
| 7th | x                |                  | x                |                  | x                |
| 8th | x                |                  |                  | x                | x                |

X = ENGAGED CLUTCH OR BRAKE

FIG. 4

EIGHT SPEED TRANSMISSION WITH PLANETARY AND LAYSHAFT GEARING

CROSS-REFERENCE TO RELATED APPLICATIONS

This application claims the benefit of U.S. Provisional Patent Application No. 60/947,150, filed Jun. 29, 2007, and which is hereby incorporated by reference in its entirety.

TECHNICAL FIELD

The invention relates to a multi-speed transmission having planetary gear sets and layshaft gear sets, and that can achieve eight forward speed ratios between an input member and an output member.

BACKGROUND OF THE INVENTION

Automatic transmissions often use planetary gear sets through which torque can be split to achieve a high overall torque ratio. Depending on the number of planetary gear sets and the number of selectively engagable torque-transmitting mechanisms, a high number of speed ratios with a pleasing ratio progression can be achieved.

Layshaft transmissions, also referred to as countershaft transmissions, utilize parallel layshafts with gears intermeshing to selectively distribute torque between the layshafts as synchronizers are engaged to connect the gears with the respective layshafts. Layshaft transmissions may offer a lower number of shifting elements and a more compact arrangement than an automatic transmission with planetary gear sets. The suitability of an automatic transmission versus a layshaft transmission for a given application typically involves a tradeoff between the efficiency and compactness of a layshaft transmission with the high torque capacity of a planetary transmission. Current front-wheel drive automatic transmissions are typically six-speed transmissions that have three planetary gear sets. There is difficulty in achieving more forward speed ratios than six in front wheel-drive applications due to transmission axial length restrictions. For rear wheel-drive applications, eight speed transmissions are known, but typically require four planetary gear sets. The axial length required to package four planetary gear sets may be too large for an on-axis passenger vehicle (i.e., a vehicle having a transmission with the transmission input member aligned with the transmission output member).

SUMMARY OF THE INVENTION

A transmission is provided that utilizes three planetary gear sets and three layshaft gear sets, as well as four rotating-type clutches and one brake that are engagable in different combinations to provide eight forward speed ratios between an input member and an output member of the transmission. By combining features of a layshaft transmission with those of a planetary transmission, the low spin losses and packaging convenience typical of a layshaft transmission are available while still achieving the high torque capacity typical of a planetary transmission.

Specifically, a multi-speed transmission is provided with an input member and an output member spaced parallel to one another to establish first and second axes of rotation. Three layshaft gear sets (a first, a second and a third layshaft gear set) are included in the transmission, each having a first gear concentric about the first axis of rotation and a second gear intermeshing with the first gear and concentric about the second axis of rotation. Furthermore, the transmission has a first, a second, and a third planetary gear set, each having a ring gear member, a sun gear member, and a carrier member and a set of pinion gears that intermesh with both the sun gear member and the ring gear member. The carrier member of each planetary gear set rotatably supports the respective set of pinion gears. Each of the planetary gear sets is concentric about either the first or the second axis of rotation. At least one of the planetary gear sets is concentric about the first axis of rotation and at least one other of the planetary gear sets is concentric about the second axis of rotation. The ring gear member of the first planetary gear set is continuously connected for common rotation with the first gear of the first layshaft gear set. The second gear of the first layshaft gear set is continuously connected for common rotation with the sun gear member of the second planetary gear set. The sun gear member of the first planetary gear set is continuously connected for common rotation with the first gear of the third layshaft gear set. An interconnecting member continuously connects the carrier member of the third planetary gear set for common rotation with the carrier member of the second planetary gear set.

Five torque-transmitting mechanisms are engaged in different combinations to establish eight forward speed ratios between the input member and the output member. A first of the torque-transmitting mechanisms is selectively engagable to ground the sun gear member of the first planetary gear set to a stationary member, such as the transmission casing. A second of the torque-transmitting mechanisms is selectively engagable to connect the ring gear member of the first planetary gear set and the first gear of the first layshaft gear set for common rotation with the first gear of the second layshaft gear set. A third of the torque-transmitting mechanisms is selectively engagable to connect the carrier member of the first planetary gear set for common rotation with the first gear of the second layshaft gear set. A fourth of the torque-transmitting mechanisms is selectively engagable to connect the ring gear member of the second planetary gear set for common rotation with the second gear of the second layshaft gear set and the sun gear member of the third planetary gear set. A fifth of the torque-transmitting mechanisms is selectively engagable to connect the ring gear member of the third planetary gear set for common rotation with the second gear of the third layshaft gear set. The gear sets and selective and continuous interconnections described above result in a compact transmission with low spin losses and high torque capacity.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a truth table illustrating the clutch engagement schedule for the transmission of FIGS. 1-3.

DESCRIPTION OF THE PREFERRED EMBODIMENTS

Figure 1:
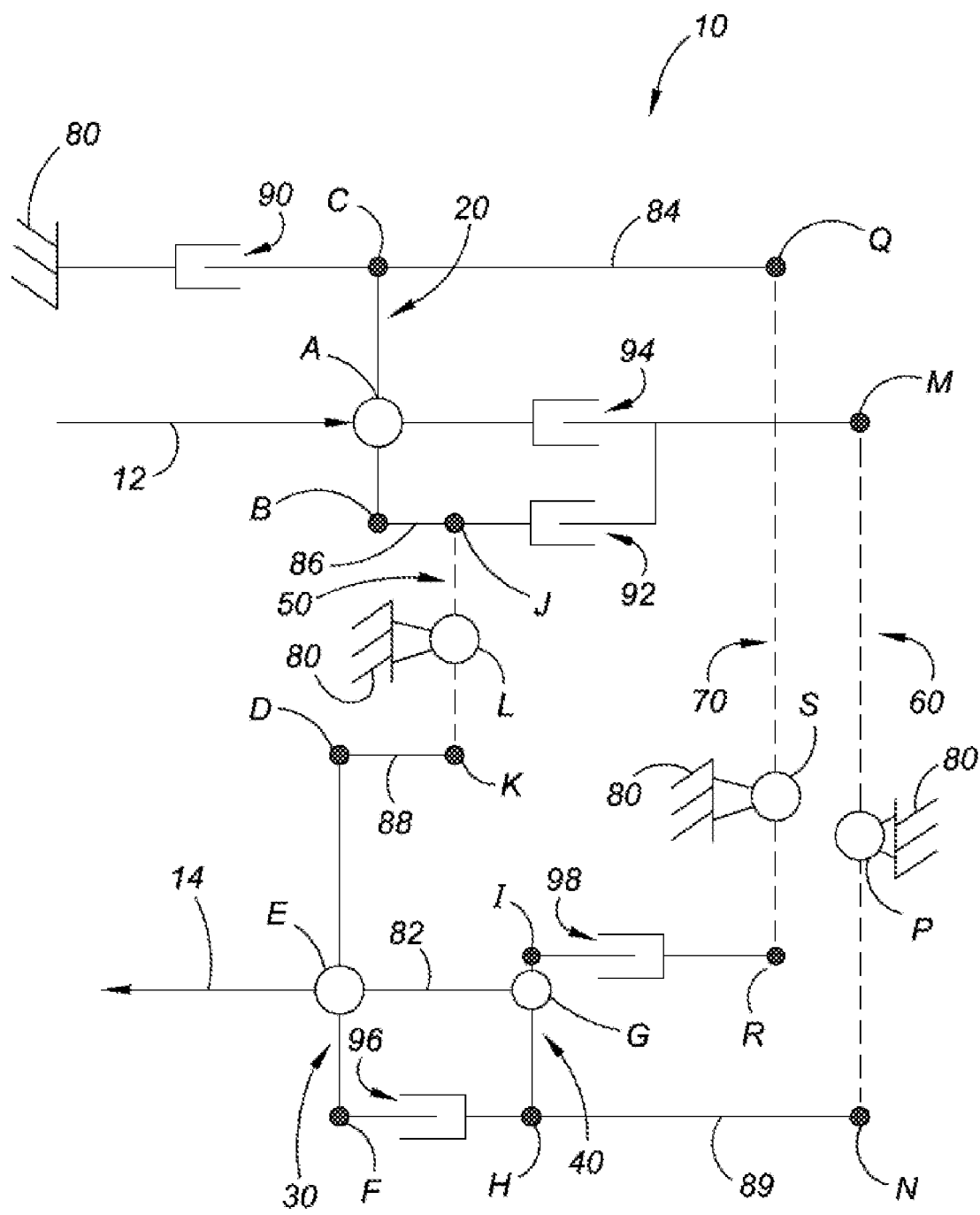
FIG. 1 is a schematic illustration in lever diagram form of a combined planetary and layshaft transmission within the scope of the invention.

Referring to the drawings, wherein like reference numbers refer to like components, FIG. 1 shows a transmission 10 in lever diagram form. The transmission 10 has an input member 12 adapted to receive power from an engine (not shown) and an output member 14. The input member 12 and output member 14 are spaced parallel to one another to establish two different axes of rotation, as will be made apparent in the stick diagram representation in FIG. 3.

The transmission 10 includes a first, a second and a third planetary gear set, represented in lever diagram form as three different three-node levers 20, 30, and 40, respectively. The first lever 20 has a first node A, representing a carrier member, a second node B representing a ring gear member, and a third node C, representing a sun gear member of the first planetary gear set. The second lever 30 has a first node D, representing a sun gear member, a second node E, representing a carrier member, and a third node F, representing a ring gear member of the second planetary gear set. The third lever 40 has a first node G, representing a carrier member, a second node H, representing a sun gear member, and a third node I, representing a ring gear member of the third planetary gear set.

The transmission 10 includes a first, a second, and a third layshaft gear set represented in lever diagram form as three different three-node levers 50, 60, and 70, respectively. Each of the levers 50, 60, and 70 has two nodes representing intermeshing first and second gears, and a grounded node therebetween, as those skilled in the art will recognize is an accurate representation in lever form of two intermeshing gears concentric about different parallel layshafts and aligned to intermesh. The levers 50, 60, 70 for the layshaft gear sets are shown as dashed lines. The lever 50 has a first node J representing a first gear, a second node K, representing a second gear, and a third node L grounded to a stationary member 80 to indicate that the first and second gears intermesh. The stationary member 80 is preferably the casing of the transmission 10. The lever 60 has a first node M, representing a first gear, a second node N, representing a second gear, and a third node P grounded to the stationary member 80 to indicate that the first and second gears intermesh. The lever 70 has a first node Q, representing a first gear, a second node R, representing a second gear, and a third node S grounded to the stationary member 80 to indicate that the first and second gears intermesh.

The input member 12 is connected for common rotation with node A. The output member 14 is connected for common rotation with node E and is spaced from and generally parallel to the input member 12. An interconnecting member 82 connects node E (i.e., the carrier member of the second planetary gear set) for common rotation with node G (i.e., the carrier member of the third planetary gear set). A hub 84 connects node C for common rotation with node Q. A hub 86 connects node B for common rotation with node J. A hub 88 connects node D for common rotation with node K. A hub 89 connects node H for common rotation with node N.

A first torque-transmitting mechanism 90, which is a brake, also referred to as a stationary-type clutch, is selectively engagable to ground node C to the stationary member 80. A second torque-transmitting mechanism 92, which is a rotating-type clutch, is selectively engagable to connect node J (as well as node B, due to hub 86) for common rotation with node M. A third torque-transmitting mechanism 94, which is a rotating-type clutch, is selectively engagable to connect node A for common rotation with node M. A fourth torque-transmitting mechanism 96, which is a rotating-type clutch, is selectively engagable to connect node F for common rotation with node H (as well as node N, due to hub 89). A fifth torque-transmitting mechanism 98, which is a rotating-type clutch, is selectively engagable to connect node I for common rotation with node R.

Figure 2:
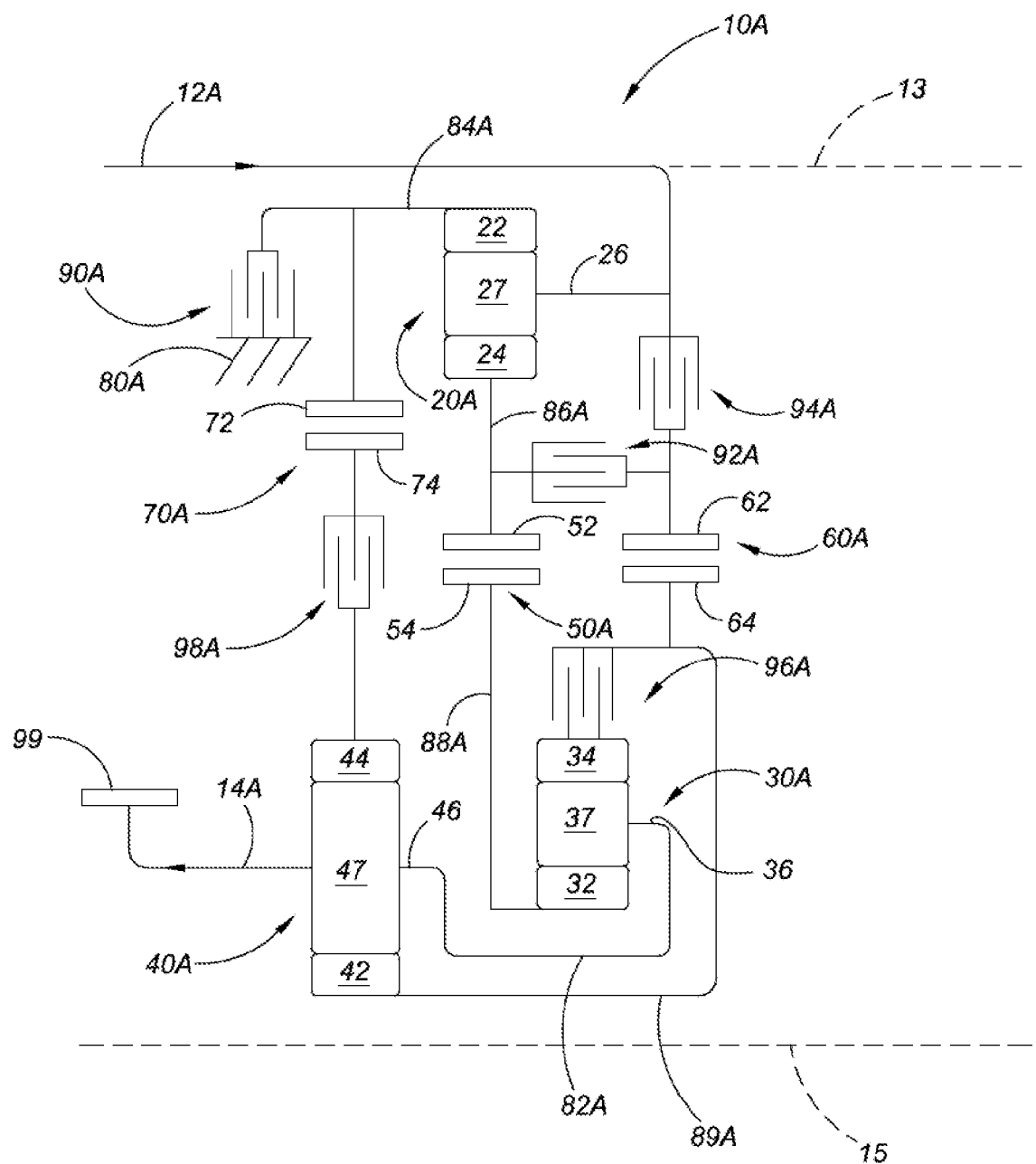
FIG. 2 is a schematic illustration in stick diagram form of the transmission of FIG. 1.

Referring to FIG. 2, the transmission 10 of FIG. 1 is shown in stick diagram form in which it is referred to as transmission 10A. It should be appreciated that transmission 10 and transmission 10A are different representations (lever and stick diagrams, respectively) of the same transmission. Similarly, equivalent components of those depicted in FIG. 1 in the transmission 10 are referred to using the same reference number followed by an "A" in the stick diagram version of the transmission 10A. The input member 12A defines a first axis 13 about which it concentrically rotates. The output member 14A is spaced parallel to the input member 12A.

The first planetary gear set 20A is shown in fragmentary form, with only that portion on one side of axis 13 about which it concentrically rotates being depicted. A sun gear member 22, a ring gear member 24, and a carrier member 26 rotatably supporting pinion gears 27 are concentric about the axis 13. The pinion gears 27 mesh with both the sun gear member 22 and the ring gear member 24. The sun gear member 22 corresponds with node C, the carrier member 26 corresponds with node A, and the ring gear member 24 corresponds with node B.

The second planetary gear set 30A is shown in fragmentary form, with only that portion on one side of axis 15 about which it concentrically rotates being depicted. A sun gear member 32, a ring gear member 34, and a carrier member 36 rotatably supporting pinion gears 37 are concentric about the axis 15. The pinion gears 37 mesh with both the sun gear member 32 and the ring gear member 34. The sun gear member 32 corresponds with node D, the carrier member 36 corresponds with node E, and the ring gear member 34 corresponds with node F.

The third planetary gear set 40A is shown in fragmentary form, with only that portion on one side of axis 15 about which it concentrically rotates being depicted. A sun gear member 42, a ring gear member 44, and a carrier member 46 rotatably supporting pinion gears 47 are concentric about the axis 15. The pinion gears 47 mesh with both the sun gear member 42 and the ring gear member 44. The sun gear member 42 corresponds with node H, the carrier member 46 corresponds with node G, and the ring gear member 44 corresponds with node I.

A first layshaft gear set 50A, corresponding with lever 50 of FIG. 1, includes a first gear 52 intermeshing with a second gear 54, and corresponding with nodes J and K of FIG. 1, respectively. The first gear 52 is concentric about axis 13, and the second gear 54 is concentric about axis 15. A second layshaft gear set 60A, corresponding with lever 60 of FIG. 1, includes a first gear 62 intermeshing with a second gear 64, and corresponding with nodes M and N of FIG. 1, respectively. The first gear 62 is concentric about axis 13, and the second gear 64 is concentric about axis 15. A third layshaft gear set 70A, corresponding with lever 70 of FIG. 1, includes a first gear 72 intermeshing with a second gear 74, and corresponding with nodes Q and R of FIG. 1, respectively. The first gear 72 is concentric about axis 13, and the second gear 74 is concentric about axis 15.

The input member 12A is connected for common rotation with the carrier member 26. The output member 14A is connected for common rotation with the carrier member 46. A gear 99 is shown connected with the output member 14A. Gear 99 is a first gear of a final drive gear set shown in more detail in FIG. 3. An interconnecting member 82A connects the carrier member 36 for common rotation with the carrier member 46. A hub 84A connects sun gear member 22 for common rotation with first gear 72. A hub 86A connects ring gear member 24 for common rotation with first gear 52. A hub 88A connects sun gear member 32 for common rotation with second gear 54. A hub 89A connects sun gear member 42 for common rotation with second gear 64.

A first torque-transmitting mechanism 90A, which is a brake, is selectively engagable to ground sun gear member 22 and first gear 72 to the stationary member 80A. A second torque-transmitting mechanism 92A, which is a rotating-type clutch, is selectively engagable to connect ring gear member 24 and first gear 52 for common rotation with first gear 62. A third torque-transmitting mechanism 94A, which is a rotating-type clutch, is selectively engagable to connect carrier member 26 for common rotation with first gear 62. A fourth torque-transmitting mechanism 96A, which is a rotating-type clutch, is selectively engagable to connect sun gear member 42 for common rotation with ring gear member 34. A fifth torque-transmitting mechanism 98A, which is a rotating-type clutch, is selectively engagable to connect ring gear member 44 for common rotation with second gear 74.

Figure 3:
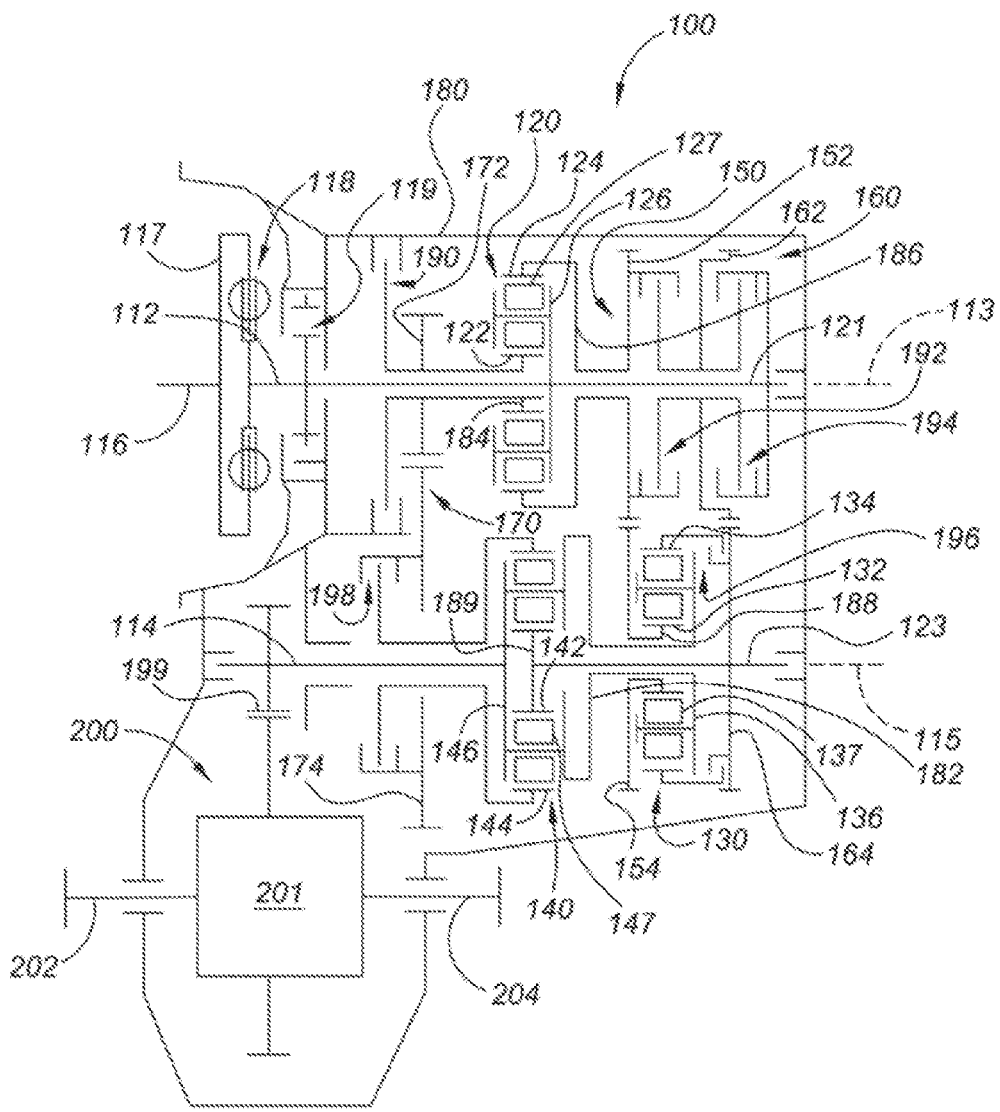
FIG. 3 is a schematic illustration of the transmission of FIGS. 1 and 2 showing the component layout about axes of rotation established by the input member and the output member.

Referring to FIG. 3, a transmission 100 is shown in stick diagram form and corresponds with the transmission 10 of FIG. 1 and the transmission 10A of FIG. 2. It should be appreciated that transmission 100 is a different representation of the same transmission 10 and 10A. Components identical to those of FIG. 1 are represented by the same reference numbers raised by 100. An input member 112 receives power from an engine output member 116 through a flywheel or flexplate 117 driving the input member 112 through a damper mechanism 118. An engine-driven pump 119 is driven off of the input member 112. Although not shown, optionally, a torque converter may be used between the engine output member 116 and the input member 112.

The input member 112 is integrally connected with a first layshaft 121 with which it defines a first axis of rotation 113. The output member 114 is spaced parallel to the input member and partially defines a second axis of rotation 115 with a second layshaft 123 with which it is axially aligned.

The first planetary gear set 120 includes a sun gear member 122, a ring gear member 124, and a carrier member 126 rotatably supporting pinion gears 127, each of which concentrically rotates about axis 113. The sun gear member 122 corresponds with sun gear member 22 and node C of FIGS. 1 and 2, the carrier member 126 corresponds with carrier member 26 and node A, and the ring gear member 124 corresponds with ring gear member 24 and node B of FIGS. 1 and 2. The pinion gears 127 mesh with both the sun gear member 122 and the ring gear member 124.

The second planetary gear set 130 includes a sun gear member 132, a ring gear member 134, and a carrier member 136 rotatably supporting pinion gears 137, each of which concentrically rotates about axis 115. The sun gear member 132 corresponds with sun gear member 32 and node D of FIGS. 1 and 2, the carrier member 136 corresponds with carrier member 36 and node E of FIGS. 1 and 2, and the ring gear member 134 corresponds with ring gear member 34 and node F of FIGS. 1 and 2. The pinion gears 137 mesh with both the sun gear member 132 and the ring gear member 134.

The third planetary gear set 140 includes a sun gear member 142, a ring gear member 144, and a carrier member 146 that rotatably supporting pinion gears 147, each of which concentrically rotates about the axis 115. The sun gear member 142 corresponds with sun gear member 42 and node H of FIGS. 1 and 2, the carrier member 146 corresponds with carrier member 46 and node G of FIGS. 1 and 2, and the ring gear member 144 corresponds with ring gear member 44 and node I of FIGS. 1 and 2. The pinion gears 147 mesh with both the sun gear member 142 and the ring gear member 144.

A first layshaft gear set 150, corresponding with layshaft gear set 50A of FIG. 2 and lever 50 of FIG. 1, includes a first gear 152 intermeshing with a second gear 154, and corresponding with nodes J and K of FIG. 1, and first gear 52 and second gear 54 of FIG. 2, respectively. The first gear 152 is concentric about axis 113, and the second gear 154 is concentric about axis 115. A second layshaft gear set 160, corresponding with layshaft gear set 60A of FIG. 2 and with lever 60 of FIG. 1, includes a first gear 162 intermeshing with a second gear 164, and corresponding with nodes M and N of FIG. 1, and gears 62 and 64 of FIG. 2, respectively. The first gear 162 is concentric about axis 113, and the second gear 164 is concentric about axis 115. A third layshaft gear set 170, corresponding with lever 70 of FIG. 1 and layshaft gear set 70A of FIG. 2, includes a first gear 172 intermeshing with a second gear 174, and corresponding with nodes Q and R of FIG. 1, and gears 72 and 74 of FIG. 2, respectively. The first gear 172 is concentric about axis 113, and the second gear 174 is concentric about axis 115.

The input member 112 is connected for common rotation with the carrier member 126. The output member 114 is connected for common rotation with the carrier member 146. A gear 199 is shown connected with the output member 114. Gear 199 corresponds with gear 99 of FIG. 2, and is a first gear of a final drive gear set 200 that includes a differential 201 to deliver tractive power from the output member 114 to front wheel axles 202 and 204, establishing the transmission 100 as a front wheel-drive transmission.

An interconnecting member 182 connects the carrier member 136 for common rotation with the carrier member 146 and corresponds with interconnecting members 82 and 82A of FIGS. 1 and 2, respectively. A hub 184 connects sun gear member 122 for common rotation with first gear 172, and corresponds with hubs 84 and 84A of FIGS. 1 and 2 respectively. A hub 186 connects ring gear member 124 for common rotation with first gear 152, and corresponds with hubs 86 and 86A of FIGS. 1 and 2, respectively. A hub 188 connects sun gear member 132 for common rotation with second gear 154, and corresponds with hubs 88 and 88A of FIGS. 1 and 2, respectively. A hub 189 connects sun gear member 142 for common rotation with second gear 164, and corresponds with hubs 89 and 89A of FIGS. 1 and 2, respectively.

A first torque-transmitting mechanism 190, which is a brake corresponding to torque-transmitting mechanisms 90 and 90A, is selectively engagable to ground sun gear member 122 and first gear 172 to stationary member 180, which is depicted as the transmission casing, and corresponds with stationary members 80 and 80A of FIGS. 1 and 2, respectively. A second torque-transmitting mechanism 192, which is a rotating-type clutch corresponding to torque-transmitting mechanisms 92 and 92A of FIGS. 1 and 2, respectively, is selectively engagable to connect ring gear member 124 and first gear 152 for common rotation with first gear 162. A third torque-transmitting mechanism 194, which is a rotating-type clutch corresponding to torque-transmitting mechanisms 94 and 94A of FIGS. 1 and 2, respectively, is selectively engagable to connect carrier member 126 for common rotation with first gear 162. A fourth torque-transmitting mechanism 196, which is a rotating-type clutch corresponding to torque-transmitting mechanisms 96 and 96A of FIGS. 1 and 2, respectively, is selectively engagable to connect sun gear member 142 for common rotation with ring gear member 134. A fifth torque-transmitting mechanism 198, which is a rotating-type clutch corresponding to torque-transmitting mechanisms 98 and 98A of FIGS. 1 and 2, respectively, is selectively engagable to connect ring gear member 144 for common rotation with second gear 174.

Referring to FIG. 4, a truth table shows the engagement schedule to achieve a reverse speed ratio (REV) and eight forward speed ratios (1st, 2nd, 3rd, 4th, 5th, 6th, 7th, and 8th), (with N representing neutral). Each column represents the engagement status of a particular torque-transmitting mechanism. An "X" indicates that the torque-transmitting mechanism of that column is engaged in the speed ratio indicated in the row. The reference numbers of corresponding torque-transmitting mechanisms of each of FIGS. 1-3 are shown above the appropriate column. FIG. 4 indicates that the torque-transmitting mechanisms are engaged in combinations of three to establish a given speed ratio. FIG. 4 also indicates that shifts between subsequent forward speed ratios are single transition shifts. Each arrow extending between one row and the next extends from the torque-transmitting mechanism that is disengaged to the torque-transmitting mechanism that is engaged to establish a ratio change (gear shift) via a single transition shift (i.e., only one torque-transmitting mechanism is disengaged and another is engaged while two others remain engaged to establish a speed ratio change).

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input member and an output member spaced parallel to one another to establish first and second axes of rotation;
a first, a second and a third layshaft gear set, each having a first gear concentric about the first axis of rotation and a second gear intermeshing with the first gear and concentric about the second axis of rotation;
a stationary member;
a first, a second, and a third planetary gear set, each having a ring gear member, a sun gear member, and a carrier member and a set of pinion gears that intermesh with both the sun gear member and the ring gear member, with the carrier member rotatably supporting the set of pinion gears; wherein each of the planetary gear sets is concentric about either the first or the second axis of rotation, with at least one of the planetary gear sets concentric about the first axis of rotation and at least one other of the planetary gear sets concentric about the second axis of rotation; wherein the ring gear member of the first planetary gear set is continuously connected for common rotation with the first gear of the first layshaft gear set; wherein the second gear of the first layshaft gear set is continuously connected for common rotation with the sun gear member of the second planetary gear set; wherein the sun gear member of the first planetary gear set is continuously connected for common rotation with the first gear of the third layshaft gear set;
an interconnecting member continuously connecting the carrier member of the third planetary gear set for common rotation with the carrier member of the second planetary gear set;
a first torque-transmitting mechanism selectively engagable to ground the sun gear member of the first planetary gear set to the stationary member;
a second torque-transmitting mechanism selectively engagable to connect the ring gear member of the first planetary gear set and the first gear of the first layshaft gear set for common rotation with the first gear of the second layshaft gear set;
a third torque-transmitting mechanism selectively engagable to connect the carrier member of the first planetary gear set for common rotation with the first gear of the second layshaft gear set;
a fourth torque-transmitting mechanism selectively engagable to connect the ring gear member of the second planetary gear set for common rotation with the second gear of the second layshaft gear set and the sun gear member of the third planetary gear set;
a fifth torque-transmitting mechanism selectively engagable to connect the ring gear member of the third planetary gear set for common rotation with the second gear of the third layshaft gear set; and
wherein engagement of different combinations of the torque-transmitting mechanisms establishes eight forward speed ratios between the input member and the output member.

2. The transmission of claim 1, wherein the input member is continuously connected for common rotation with the carrier member of the first planetary gear set; and wherein the output member is continuously connected for common rotation with the carrier member of the third planetary gear set.

3. The transmission of claim 1, wherein the planetary gear sets are single pinion planetary gear sets.

4. The transmission of claim 1, wherein the torque-transmitting mechanisms are engaged in combinations of three to establish the eight forward speed ratios.

5. The transmission of claim 1, wherein shifts between the forward speed ratios are single transition shifts.

6. The transmission of claim 1, wherein each layshaft gear set is axially spaced from another of the layshaft gear sets with a respective one of the planetary gear sets therebetween.

* * * * *